2,477,925

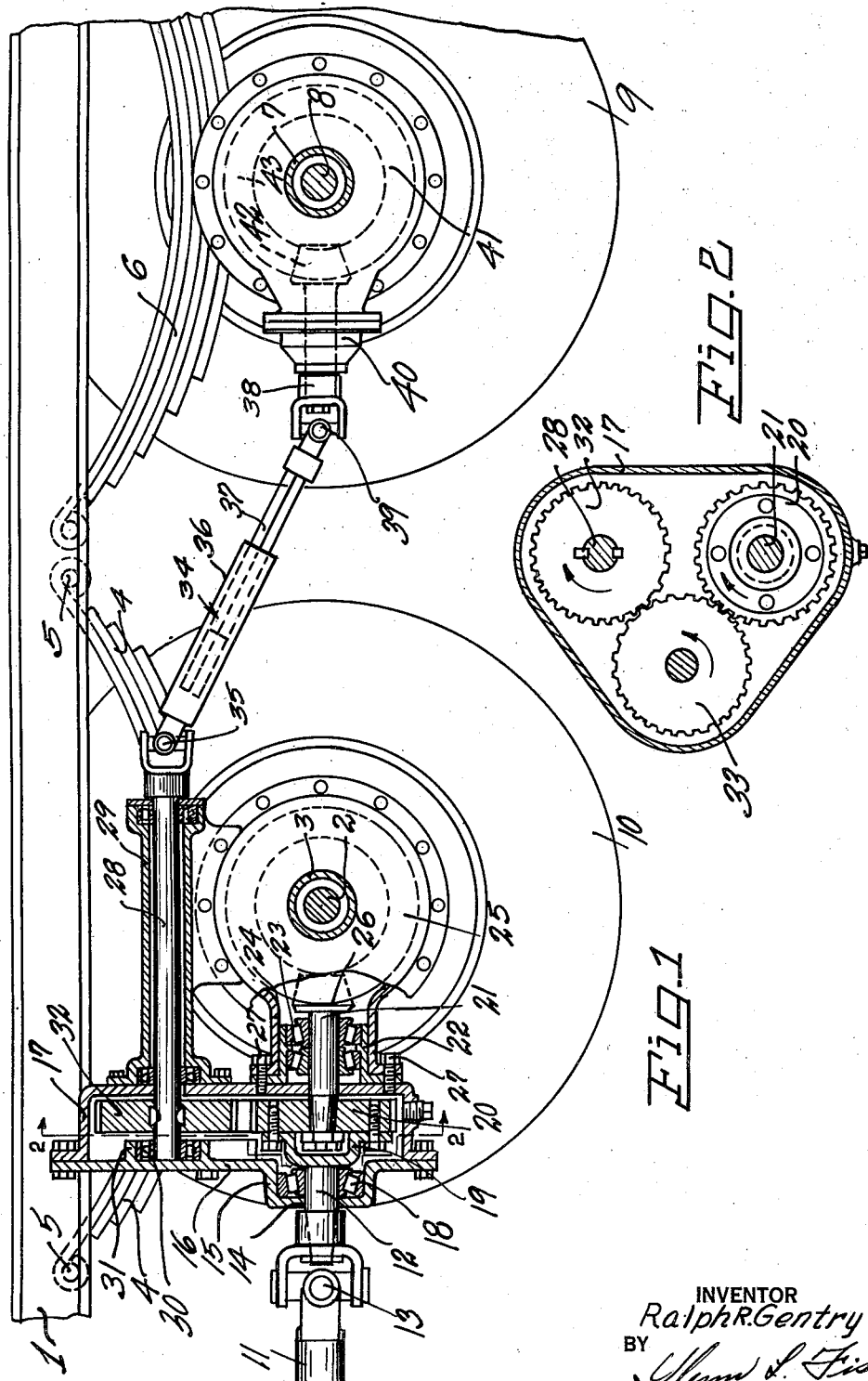
Aug. 2, 1949.  R. R. GENTRY  2,477,925
DUAL DRIVE FOR TRUCKS
Filed Dec. 3, 1945
INVENTOR
Ralph R. Gentry
BY
ATTORNEY Patented Aug. 2, 1949

UNITED STATES PATENT OFFICE 2,477,925

DUAL DRIVE FOR TRUCKS

Ralph R. Gentry, Spokane, Wash.

Application December 3, 1945, Serial No. 632,483

1 Claim. (Cl. 180—22)

This invention relates to a dual drive for large vehicles such as trucks and vans which carry heavy loads. In certain localities laws governing the loading of trucks are based upon the number of tires under a load and it is therefore one object of the invention to provide a truck with extra wheels mounted back of the wheels customarily provided for a truck of a certain size and thus provide the truck with extra wheels and allow the truck to be used for hauling loads heavier than originally estimated for when building the truck.

Another object of the invention is to provide a truck with extra wheels carried by an axle mounted rearwardly of the axle usually provided and driven from the main drive shaft of the truck by special shafts and gearing.

Another object of the invention is to provide a truck with extra wheels having the axle carrying the same supported by springs mounted upon side bars of the chassis, rotary motion being transmitted to the axle of the extra wheels by a shaft having telescoping sections so that the extra axle may have vertical movement when traveling over rough roads without bending the said shaft.

Another object of the invention is to provide an improved arrangement of gearing for transmitting rotary motion from the main drive shaft to the two axles and cause the two axles to rotate at the same speed and in the same direction.

Another object of the invention is to provide a truck with extra wheels and power transmitting mechanism for the axle carrying the same which is of simple construction and not liable to be broken when subjected to jolts and strains.

The invention is illustrated in the accompanying drawings wherein:

Fig. 1 is a sectional view taken longitudinally of a truck provided with extra wheels and mechanism for transmitting rotary motion to the axle carrying the extra wheels.

Fig. 2 is a sectional view taken along the line 2—2 of Figure 1.

The truck which is of a conventional construction has the usual chassis bars 1 at its sides and a rear axle 2 in a casing 3 carried by the usual springs 4 which extend longitudinally of the chassis bars and have their ends secured to the chassis bars. The rear axle and its casing are disposed forwardly from the rear end of the chassis and the springs 4 are connected with the chassis bars by the usual pins 5 and disposed in forwardly spaced relation to their rear ends to such an extent that springs 6 may be mounted under the chassis bars back of the springs 4. These springs 6 carry an axle casing 7 through which is mounted an auxiliary axle 8 and the axle 8 carries wheels 9, which may be termed auxiliary wheels and assist the wheels 10 on the shaft 2 to support the loaded vehicle. All of the wheels are equipped with pneumatic tires and it will thus be seen that the vehicle will be provided with extra tires and a greater load may be transported in the vehicle than would be the case if the vehicle were only provided with the wheels 10.

The vehicle is provided with the usual main drive shaft 11 by means of which rotary motion is transmitted from the power plant to the rear axle 2 and this shaft is connected with a short stub shaft 12 by a universal coupling 13 of conventional construction. The shaft 12 passes through an opening 14 formed in a pocket 15 of a plate 16 constituting a front wall or closure for a housing or casing 17 and in order to rotatably mount the stub shaft there has been provided a bearing 18 which fits into the pocket. A yoke or cup-shaped head 19 at the inner end of the stub shaft is secured to a gear 20 carried by the tapered front end portion of a short transmission shaft 21 which extends rearwardly from the casing 17 through a sleeve 22 and a rotatably mounted bearing 23 in the sleeve. The sleeve 22 fits into the neck 24 of the differential housing 25 of the axle casing 3 and carries a pinion 26 for meshing with the usual differential gears and the neck 24 and the sleeve 23 are secured to the casing 17 by screws 27.

A supplemental shaft 28 is rotatably mounted in a tubular casing 29 extending rearwardly from the upper portion of the casing 17 and this shaft has its forward portion extending through the casing and rotatably mounted by a bearing 30 which fits into a cut 31 carried by the front wall 16 of the casing. A gear 32 is mounted upon the shaft 28 within the casing 17 and this gear meshes with an idler gear 33 which also meshes with the gear 20 and causes the gear 32 and the shaft 28 to turn in the same direction as the shaft 21. The rear end of shaft 28 protrudes from the casing 29 and is connected with the front end of a shaft 34 by a universal coupling 35. The shaft 34 is adjustable longitudinally and consists of a hollow front section 36 and a solid rear section 37 which is slidably received in the front section and at its rear end is connected with the front end of a short transmission shaft 38 by a universal coupling 39. The shaft 38 corresponds to the shaft 21 and is rotatably mounted in the neck 40 of the differential housing 41 of the axle casing 7, the rear end of shaft 38 carrying a pinion 42 which meshes with the differential gear 43. By this arrangement the shafts 28 and 34 will be turned in the same direction and at the same speed as the shaft 21 and the auxiliary axle 8 will be turned at the same speed as the axle 2. Therefore the wheels will all turn in the same direction and at the same speed and since the wheels 9 and 10 are spaced from each other longitudinally of the chassis the weight of the load will be distributed over a larger area than would be the case if there were only one set of rear wheels.

Having thus described the invention, what is claimed is:

In a vehicle structure, a chassis, a main rear axle and its casing under the chassis extending transversely thereof, springs suspending the casing from the chassis, a drive shaft rotatably mounted longitudinally of the chassis and disposed in front of the casing, a transmission shaft for transmitting rotary motion from the drive shaft to the axle, a housing mounted at the front of the casing and enclosing the transmission shaft, a gear on the front end of the transmission shaft within the housing, a stub shaft journaled through the front wall of the housing, said stub shaft having a head at its rear end secured to the gear and at its front end being connected with the drive shaft by a universal joint, an idler gear in the housing meshing with the first gear, a tube extending longitudinally of the chassis from the housing rearwardly over the axle casing, a supplemental shaft rotatably mounted through said tube and having its front end extending into the housing and carrying a gear meshing with the idler gear, a longitudinally extensible shaft extending longitudinally of the chassis back of the tube and having its front end connected with the supplemental shaft by a universal joint, an auxiliary axle and its casing extending transversely of the chassis back of the main axle and suspended from the chassis by springs, and a stub shaft rotatably mounted in the casing of the auxiliary axle longitudinally of the chassis and having its rear end geared to the auxiliary axle and its front end connected with the rear end of the extensible shaft by a universal joint.

RALPH R. GENTRY.

REFERENCES CITED

The following references are of record in the file of this patent:

UNITED STATES PATENTS

| Number | Name | Date |
| --- | --- | --- |
| 1,627,303 | Zoelly | May 3, 1927 |
| 1,729,896 | Rebman | Oct. 1, 1929 |
| 1,780,599 | Parker | Nov. 4, 1930 |
| 1,794,099 | Alden | Feb. 24, 1931 |
| 1,896,664 | De Wolfe | Feb. 7, 1933 |
| 1,927,276 | Bryan | Sept. 19, 1933 |
| 1,956,583 | Morgan | May 1, 1934 |